United States Patent
Rintaluoma (10) Patent No.: US 9,014,265 B1
(45) Date of Patent: Apr. 21, 2015

(54) VIDEO CODING USING EDGE DETECTION AND BLOCK PARTITIONING FOR INTRA PREDICTION

(75) Inventor: Tero Mikko Rintaluoma, Oulu (FI)

(73) Assignee: Google Inc., Mountain View, CA (US)

( * ) Notice: Subject to any disclaimer, the term of this patent is extended or adjusted under 35 U.S.C. 154(b) by 548 days.

(21) Appl. No.: 13/344,160

(22) Filed: Jan. 5, 2012

Related U.S. Application Data (60) Provisional application No. 61/581,358, filed on Dec. 29, 2011.

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |
| H04N 19/14 | (2014.01) |
| H04N 19/157 | (2014.01) |
| H04N 19/119 | (2014.01) |
| H04N 19/103 | (2014.01) |

(52) U.S. Cl.
CPC ............. *H04N 19/14* (2013.01); *H04N 19/157* (2013.01); *H04N 19/119* (2013.01); *H04N 19/103* (2013.01)

(58) Field of Classification Search
CPC .................. H04N 19/00278; H04N 19/00157; G06T 9/20
See application file for complete search history.

(56) References Cited

U.S. PATENT DOCUMENTS

| | | | |
|---|---|---|---|
| 4,924,310 | A | 5/1990 | von Brandt |
| 5,148,269 | A | 9/1992 | de Haan et al. |
| 5,337,086 | A | 8/1994 | Fujinami |
| 5,512,952 | A | 4/1996 | Iwamura |
| 5,537,155 | A | 7/1996 | O'Connell |
| 5,617,541 | A | 4/1997 | Albanese et al. |
| 5,675,384 | A | 10/1997 | Ramamurthy |

(Continued)

FOREIGN PATENT DOCUMENTS

| | | |
|---|---|---|
| EP | 0806866 | 11/1997 |
| EP | 0634873 | 9/1998 |

(Continued)

OTHER PUBLICATIONS

Hongliang Li; King Ngi Ngan; Zhenyu Wei, "Fast and Efficient Method for Block Edge Classification and Its Application in H.264/AVC Video Coding," Circuits and Systems for Video Technology, IEEE Transactions on , vol. 18, No. 6, pp. 756,768, Jun. 2008.*

(Continued)

*Primary Examiner* — Joseph Ustaris
*Assistant Examiner* — Rebecca Volentine
(74) *Attorney, Agent, or Firm* — Young Basile Hanlon & MacFarlane P.C.

(57) ABSTRACT

Embodiments of apparatuses and methods for encoding and decoding a video image having a plurality of frames are disclosed. In particular, intra frame encoding of a frame of the video image is improved by reducing the number of blocks and/or the number of intra coding modes that are tested before selecting the intra coding mode. An edge orientation of an edge within each block is detected, and adjacent blocks are grouped by matching edge orientation. The edge orientation can be used to determine which intra coding modes are tested for each of the groups of blocks. The intra coding mode is selected based on its compression efficiency.

16 Claims, 8 Drawing Sheets

(56) References Cited

U.S. PATENT DOCUMENTS

| | | | |
|---|---|---|---|
| 5,719,642 | A | 2/1998 | Lee |
| 5,731,840 | A | 3/1998 | Kikuchi et al. |
| 5,886,742 | A | 3/1999 | Hibi et al. |
| 5,991,447 | A | 11/1999 | Eifrig et al. |
| 6,005,980 | A | 12/1999 | Eifrig et al. |
| 6,141,053 | A | 10/2000 | Saukkonen |
| 6,236,682 | B1 | 5/2001 | Ota |
| 6,272,179 | B1 | 8/2001 | Kadono |
| 6,289,049 | B1 | 9/2001 | Kim et al. |
| 6,324,540 | B1 | 11/2001 | Khanna |
| 6,330,344 | B1 | 12/2001 | Kondo |
| 6,359,929 | B1 | 3/2002 | Boon |
| 6,381,277 | B1 | 4/2002 | Chun et al. |
| 6,385,245 | B1 | 5/2002 | De Haan |
| 6,404,738 | B1 | 6/2002 | Reininger et al. |
| 6,411,602 | B2 | 6/2002 | Schoenblum et al. |
| 6,449,312 | B1 | 9/2002 | Zhang et al. |
| 6,456,591 | B1 | 9/2002 | Mishra |
| 6,483,874 | B1 | 11/2002 | Panusopone et al. |
| 6,535,238 | B1 | 3/2003 | Kressin |
| 6,700,934 | B2 | 3/2004 | Lin |
| 6,711,211 | B1 | 3/2004 | Lainema |
| 6,721,327 | B1 | 4/2004 | Ekudden |
| 6,771,703 | B1 | 8/2004 | Oguz et al. |
| 6,778,553 | B1 | 8/2004 | Chou |
| 6,937,770 | B1 | 8/2005 | Oguz et al. |
| 7,010,037 | B2 | 3/2006 | Ye et al. |
| 7,065,004 | B2 | 6/2006 | Jiao et al. |
| 7,450,640 | B2 | 11/2008 | Kim et al. |
| 7,584,475 | B1 | 9/2009 | Lightstone et al. |
| 7,843,995 | B2 | 11/2010 | Bhaskaran et al. |
| 7,983,493 | B2 | 7/2011 | Zhang |
| 7,997,953 | B2 | 8/2011 | Kamiya et al. |
| 8,204,114 | B2 | 6/2012 | Wang et al. |
| 8,224,100 | B2 | 7/2012 | Jeong |
| 2002/0009149 | A1 | 1/2002 | Rodriguez |
| 2002/0031272 | A1 | 3/2002 | Bagni et al. |
| 2002/0039386 | A1 | 4/2002 | Han et al. |
| 2002/0146071 | A1 | 10/2002 | Liu |
| 2002/0159525 | A1 | 10/2002 | Jeong |
| 2003/0007566 | A1 | 1/2003 | Peng |
| 2003/0012275 | A1 | 1/2003 | Boice et al. |
| 2003/0035477 | A1* | 2/2003 | Sekiguchi et al. ........ 375/240.08 |
| 2005/0123054 | A1 | 6/2005 | Wang et al. |
| 2005/0220444 | A1 | 10/2005 | Ohkita et al. |
| 2006/0062481 | A1 | 3/2006 | Suvanto |
| 2006/0093036 | A1 | 5/2006 | Park et al. |
| 2006/0126729 | A1* | 6/2006 | Nakayama ............... 375/240.03 |
| 2006/0200733 | A1 | 9/2006 | Stankovic et al. |
| 2006/0222078 | A1 | 10/2006 | Raveendran |
| 2006/0285598 | A1 | 12/2006 | Tulkki |
| 2007/0009034 | A1 | 1/2007 | Tulkki |
| 2007/0036215 | A1* | 2/2007 | Pan et al. ................. 375/240.12 |
| 2007/0071356 | A1* | 3/2007 | Caviedes et al. ............. 382/268 |
| 2008/0046249 | A1 | 2/2008 | Thyssen et al. |
| 2008/0089409 | A1* | 4/2008 | Xu et al. .................... 375/240.2 |
| 2008/0123754 | A1 | 5/2008 | Ratakonda et al. |
| 2008/0152258 | A1 | 6/2008 | Tulkki |
| 2008/0225735 | A1 | 9/2008 | Qiu et al. |
| 2008/0228735 | A1 | 9/2008 | Kenedy et al. |
| 2008/0240246 | A1* | 10/2008 | Lee et al. ................. 375/240.16 |
| 2008/0304763 | A1* | 12/2008 | Nagori ......................... 382/250 |
| 2009/0021588 | A1 | 1/2009 | Border |
| 2009/0052534 | A1* | 2/2009 | Wang et al. .............. 375/240.13 |
| 2009/0067495 | A1 | 3/2009 | Au et al. |
| 2009/0225834 | A1* | 9/2009 | Song et al. ............... 375/240.12 |
| 2009/0271814 | A1 | 10/2009 | Bosscha |
| 2010/0086029 | A1 | 4/2010 | Chen et al. |
| 2010/0142761 | A1 | 6/2010 | Venkatapuram et al. |
| 2010/0208802 | A1* | 8/2010 | Tsukuba et al. ......... 375/240.12 |
| 2011/0001643 | A1 | 1/2011 | Sze et al. |
| 2011/0249743 | A1 | 10/2011 | Zhao et al. |
| 2012/0014615 | A1 | 1/2012 | Yang et al. |
| 2012/0134496 | A1 | 5/2012 | Farkash et al. |

FOREIGN PATENT DOCUMENTS

| | | |
|---|---|---|
| EP | 1578116 | 9/2005 |
| FI | 115945 | 8/2005 |
| WO | 9611457 | 4/1996 |
| WO | 0233979 | 4/2002 |
| WO | 02062072 | 8/2002 |
| WO | 02067590 | 8/2002 |
| WO | 02078327 | 10/2002 |
| WO | 03043342 | 5/2003 |

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May, 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Extended European Search Report in related matter EP10156468.

Ferzli, R., et al.; "No-Reference Objective Wavelet Based Noise Immune Image Sharpness Metric", IEEE International Conference on image processing, ICIP 2005, IEEE< Piscataway, NJ USA, vol. 1, Sep. 11, 2005, pp. 405-408.

EP Search Report dated Jan. 20, 2011 for EP patent application No. 10168540.2-1522.

Finnish Search Report in corresponding application No. 20095273 dated Jan. 8, 2010.

(56) References Cited

OTHER PUBLICATIONS

Ghanbari Mohammad, "Postprocessing of late calls for Packet Video", IEEE Transactions on Circuits and Sytems for Video Technology, vol. 6, No. 6 Dec. 1996, 2010.
International Search Report dated Feb. 16, 2007, from corresponding PCT application.
International Search Report and Written Opinion issued in co-pending PCT International Application No. PCT/US2011/042795 (6pp).
Jang, C. Cho, H-G, Automated Digital photo Classification by Tessellated Unit Block Alignment' Proceedings of the International Conference on Convergence and Hybrid Information Technology 2008 (ICHIT 2008), Aug. 28-29, 2008, pp. 204 to 210, Daejon, South Korea, XP 031319705.
Lateck, Longin Jan: "Image Similarity", Graduate Course: Computer Graphics and Image Processing, Sep. 27, 2004 (XP-002694202) Temple University, Philadelphia, retrieved from the internet: URL:http://www.cis.temple.edu/latecki/courses/C1S601-04/lectures_fall04.htm slides 5-8.
Murat A. Tekalp, "Block-based methods", Digital video processing, Prentice Hall Processing Series, Aug. 12, 1995, pp. 98-116, Prentice Hall PTR.
V asudev Bhaskaran et al., "Chapter 6: The MPEG Video Standards", Image and Video Compression Standards—Algorithms & Architectures, Second Edition, 1997, pp. 149-230 Kluwer Academic Publishers.
Sunil Kumar Liyang Xu, Mrinal K. Mandal, and Sethuraman Panchanathan, Error Resiliency Schemes in H.264/AVC Standard, Elsevier J. of Visual Communicatio & Image Representation (Special issue on Emerging H.264/AVC Video Coding Standard), vol. 17 (2), Apr. 2006.
Tasdizen, et al; "A High Performance Reconfigurable Motion Estimation Hardware Architecture", Design, Automation & Test in Europe Conference & Exhibition, Apr. 20, 2009, IEEE, Piscataway, NJ, US pp. 882-885.
Vos, Luc De and Stegherr, Michael; "Parameterizable VLSI Architectures for the Full-Search Block-Matching Algorithm", IEEE Transactions on Circuits and Systems, vol. 36, No. 10, Oct. 1989 New York US pp. 1309-1316.
Tsai et al., "Effective Subblock-Based and Pixel-Based Fast Direction Detections for H.264 Intra Prediction" in IEEE Transactions on Circuits and Systems for Video Technology, vol. 18, No. 7, Jul. 2008.
Hongliang Li; King Ngi Ngan; Zhenyu Wei, "Fast anad Efficient Method for Block Edge Classification and its Application in H.264/AVC Video Coding." Circuits and Systems for Video Technology, IEEE Transactions on, vol. 18, No. 6, pp. 756, 768, Jun. 2008.
Multi-core processor, Wikipedia, the free encyclopedia. Http://wikipedia.org/wiki/Multi-core_processor; dated Apr. 30, 2012.
Trista Pei-Chun Chen and Tsuhan Chen, Second-Generation Error Concealment for Video Transport Over Error Prone Channels, electrical computer Engineering, Carnegie Mellon University, Pittsburgh, PA 15213, U.S.A.
Wang, Yao "Error Control and Concealment for Video Communication: A Review", Proceedings of the IEEE, vol. 86, No. 5, May 1998, 24 pages.
WebM Project, WebM Video Hardware RTLs, http://www.webmproject.org/hardware/, 3 pp, (Jun. 27, 2012).
Chen, Michael C., et al.; "Design and Optimization of a Differentially Coded Variable Block Size Motion Compensation System", IEEE 1996, 4 pp.
Chen, Xing C., et al., "Quadtree Based Adaptive Lossy Coding of Motion Vectors", IEEE 1996, 4 pp.
Ebrahimi T Ed—Institute of Electrical and Electronics Engineers: "A new technique for motion field segmentation and coding for very low bitrate video coding applications", Proceedings of the International Conference on Image Processing (ICIP); Austin, Nov. 13-16, 1994.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

\* cited by examiner

VIDEO CODING USING EDGE DETECTION AND BLOCK PARTITIONING FOR INTRA PREDICTION

CROSS-REFERENCE TO RELATED APPLICATIONS

This application claims priority to U.S. Provisional Patent Application No. 61/581,358, filed Dec. 29, 2011, which is hereby incorporated by reference in its entirety.

TECHNICAL FIELD

The present invention relates in general to video encoding and decoding.

BACKGROUND

Digital video streams typically represent video using a sequence of frames (i.e. still images). An increasing number of applications today make use of digital video stream encoding for purposes other than traditional moving pictures (such as movies and video clips). For example, screen capture and screen casting applications generally represent the output of a computer monitor over time as a digital video stream, irrespective of the specialized nature of the content of the monitor. To permit transmission of digital video streams while limiting bandwidth consumption, a number of video compression schemes have been devised.

SUMMARY

Disclosed herein are embodiments of systems, methods and apparatuses for encoding and decoding a video signal. One aspect of the disclosed embodiments is a method for encoding a frame of a video stream comprising a plurality of frames. The method comprises selecting a plurality of blocks of the frame, detecting, for each selected block of the plurality of blocks, an edge orientation within the selected block, grouping a first block with at least one adjacent block of the plurality of blocks to form a block partition when the first block and the at least one adjacent block have a matching edge orientation, testing a plurality of intra prediction modes for encoding the block partition using a processor, selecting a prediction mode for encoding the block partition from the plurality of intra prediction modes based upon a result of testing the plurality of intra prediction modes, and encoding the block partition based on the selected prediction mode.

Another aspect of the disclosed embodiments is an apparatus for encoding a frame in a video stream comprising a plurality of frames, the apparatus comprising a memory and a processor configured to execute instructions stored in the memory. The instructions select a plurality of blocks of the frame, detect, for each selected block of the plurality of blocks, an edge orientation within the selected block, group a first block with at least one adjacent block of the plurality of blocks to form a block partition when the first block and the at least one adjacent block have a matching edge orientation, test a plurality of intra prediction modes for encoding the block partition, select a prediction mode for encoding the block partition from the plurality of intra prediction modes based upon a result of testing the plurality of intra prediction modes, and encode the block partition based on the selected prediction mode.

Another apparatus for encoding a frame in a video stream comprising a plurality of frames as disclosed herein comprises means for selecting a plurality of blocks of the frame, means for detecting, for each selected block of the plurality of blocks, an edge orientation within the selected block, means for grouping a first block with at least one adjacent block of the plurality of blocks to form a block partition when the first block and the at least one adjacent block have a matching edge orientation, means for testing a plurality of intra prediction modes for encoding the block partition, means for selecting a prediction mode for encoding the block partition from the plurality of intra prediction modes based upon a result of testing the plurality of intra prediction modes, and means for encoding the block partition based on the selected prediction mode.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit transmission of digital video streams while limiting bandwidth consumption, video encoding and decoding schemes incorporate various compression schemes. These compression schemes generally break the image up into blocks and use one or more techniques to limit the amount of information included in a resulting digital video bitstream for transmission. The bitstream, once received, is then decoded to re-create the blocks and the source images from the limited information.

One technique that limits the amount of information needed to re-create an image is intra-frame prediction (also called intra prediction herein). The image is divided, typically into a series of adjacent blocks, and then the blocks are examined to determine if the data within a target block can be accurately predicted based on previously processed block(s) of the image. If so, the target block is encoded as the difference between the prediction values from these reference block(s) and actual values of the target block. In addition to smaller values, many times the difference is zero. This reduces the size of the subsequently encoded and transmitted block. Decoding the target block reverses these operations. Following decoding, the prediction values are extracted and added to the difference values, thereby substantially restoring the original data values of the target block.

Current video coding standards use only few possible block sizes for intra prediction, mainly 16×16 and 4×4 sized blocks. Compression efficiency could be improved by using other block sizes, such as non-square blocks like 16×8 or 8×16 or much larger blocks like 128×128 or 128×64, for example. However, the number of possible combinations of blocks grows exponentially if all prediction modes are tested for all block sizes so as to select one that gives best compression efficiency.

According to teachings herein, an edge detection algorithm is used to decide efficient block partitioning so as to improve coding efficiency and reduce the number of computations.

Figure 1:
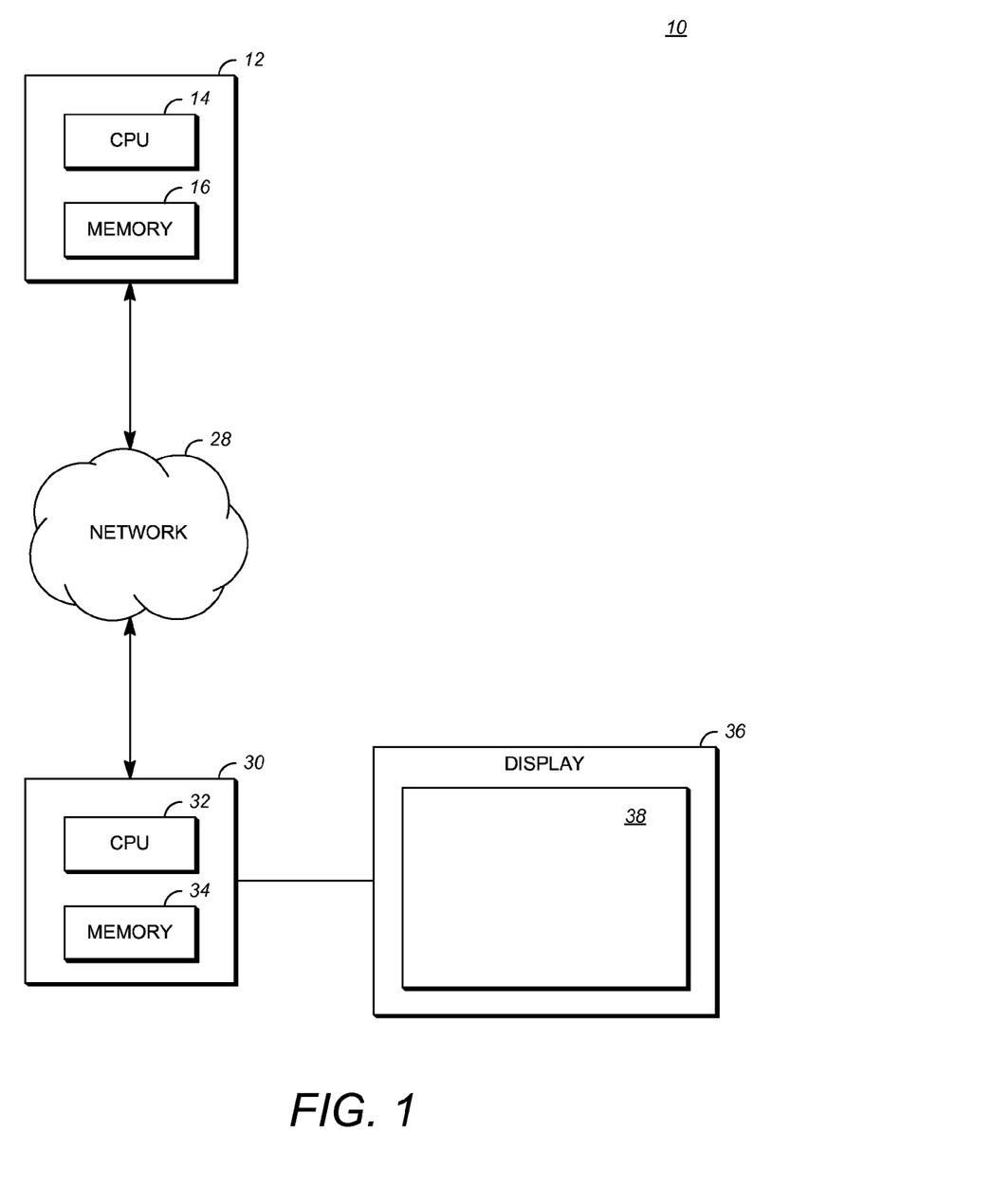
FIG. 1 is a schematic of a video encoding and decoding system.

FIG. 1 is a schematic of a video encoding and decoding system 10. An exemplary transmitting station 12 can be, for example, a computer having an internal configuration of hardware including a processor such as a central processing unit (CPU) 14 and a memory 16. CPU 14 is a controller for controlling the operations of transmitting station 12. CPU 14 is connected to memory 16 by, for example, a memory bus. Memory 16 can be read only memory (ROM), random access memory (RAM) or any other suitable memory device. Memory 16 can store data and program instructions that are used by CPU 14. Other suitable implementations of transmitting station 12 are possible. For example, the processing of transmitting station 12 can be distributed among multiple devices.

A network 28 connects transmitting station 12 and a receiving station 30 for encoding and decoding of the video stream. Specifically, the video stream can be encoded in an encoder transmitting station 12 and the encoded video stream can be decoded in receiving station 30. Network 28 can be, for example, the Internet. Network 28 can also be a local area network (LAN), wide area network (WAN), virtual private network (VPN), a cellular telephone network or any other means of transferring the video stream from transmitting station 12.

Receiving station 30, in one example, can be a computer having an internal configuration of hardware including a processor such as a CPU 32 and a memory 34. CPU 32 is a controller for controlling the operations of receiving station 30. CPU 32 is connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of the receiving station 30 can be distributed among multiple devices.

A display 36 configured to display a video stream can be connected to receiving station 30. Display 36 can be implemented in various ways, including by a liquid crystal display (LCD), a cathode-ray tube (CRT) or a light emitting diode display (LED), such as an OLED display. Display 36 is coupled to CPU 32 and can be configured to display a rendering 38 of the video stream decoded by a decoder in receiving station 30.

Other implementations of encoder and decoder system 10 are possible. In the embodiments described, for example, an encoder is in transmitting station 12 and a decoder is in receiving station 30 as instructions in memory or a component separate from memory. However, an encoder or decoder can be coupled to a respective station 12, 30 rather than in it. Further, one implementation can omit network 28 and/or display 36. In another implementation, a video stream can be encoded and then stored for transmission at a later time to receiving station 30 or any other device having memory. In another implementation, additional components can be added to encoder and decoder system 10. For example, a display or a video camera can be attached to transmitting station 12 to capture the video stream to be encoded. In an exemplary implementation, a real-time transport protocol (RTP) is used for transmission. In another implementation, a transport protocol other than RTP may be used.

Figure 2:
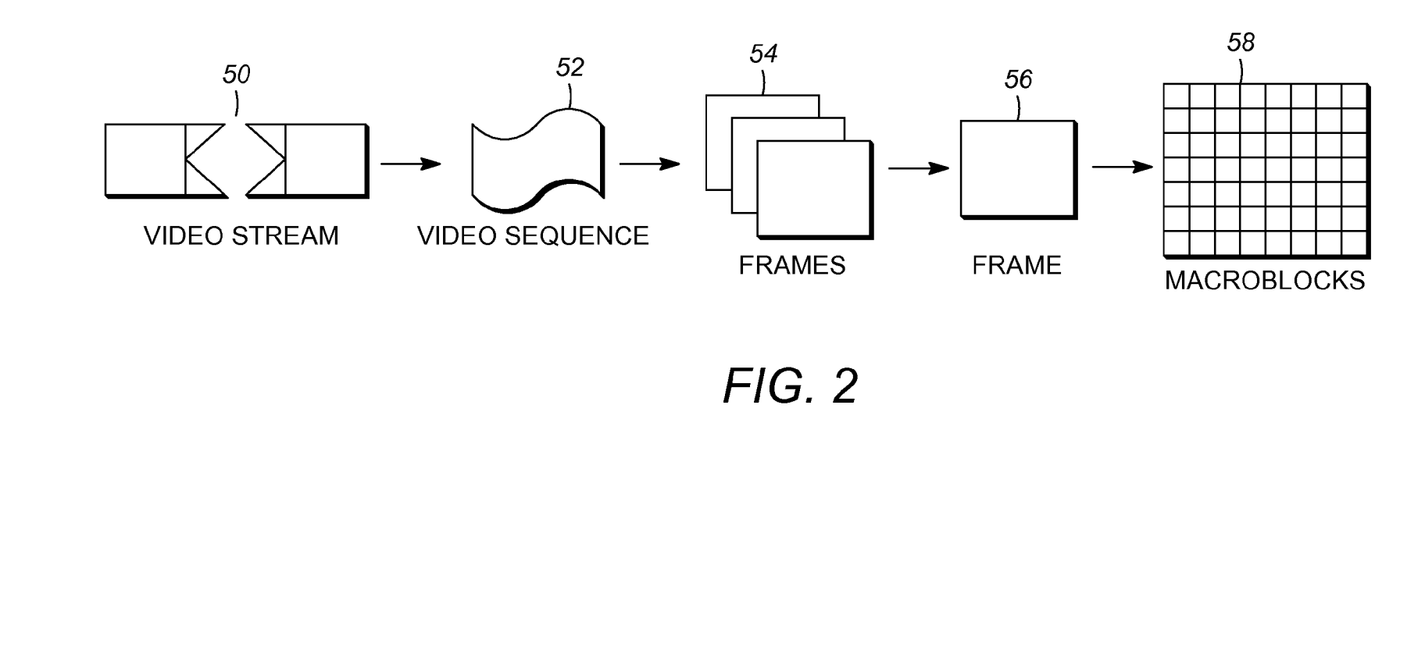
FIG. 2 is a diagram of a typical video stream to be encoded and decoded.

FIG. 2 is a diagram of a typical video stream 50 to be encoded and subsequently decoded. Video coding formats, such as VP8 or H.264, provide a defined hierarchy of layers for a video stream. Video stream 50 includes a video sequence 52. At the next level, video sequence 52 includes a number of adjacent frames 54. While three frames are depicted as adjacent frames 54, video sequence 52 can include any number of adjacent frames. Adjacent frames 54 can then be further subdivided into a single frame 56. At the next level, single frame 56 can be divided into a series of blocks 58, which can contain data corresponding to, for example, a 16×16 pixel group of displayed pixels in frame 56. Each block 58 can contain luminance and chrominance data for the corresponding pixels. Blocks 58 can also be of any other suitable size such as 16×8 pixel groups or 8×16 pixel groups and can be further subdivided into smaller blocks depending on the application. Unless otherwise noted herein, the term macroblock is used to refer to 16×16 or larger pixel groups, while the term block is used for any grouping of pixels.

Figure 3:
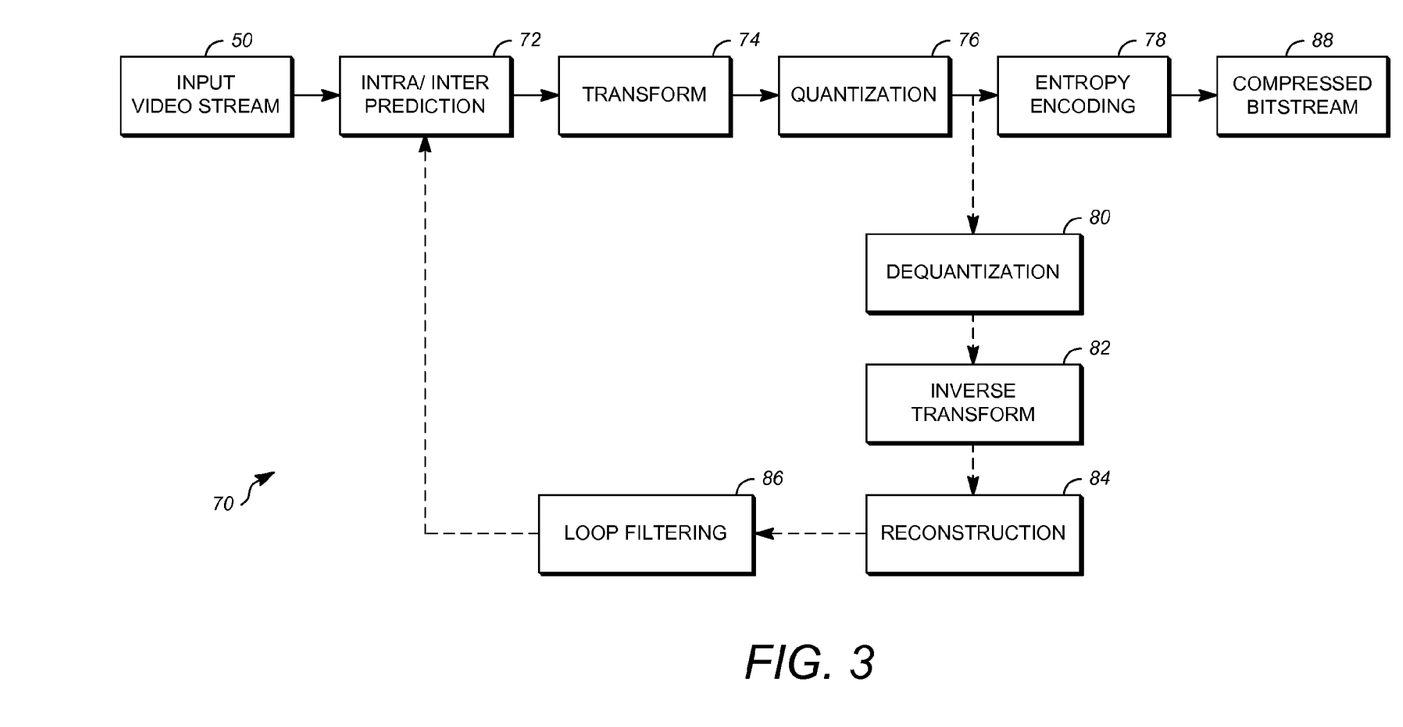
FIG. 3 is a block diagram of a video compression system in accordance with one embodiment.

FIG. 3 is a block diagram of an encoder 70 in accordance with one embodiment. Encoder 70 can be implemented, as described above, in transmitting station 12. Encoder 70 encodes an input video stream 50. Encoder 70 has the following stages to perform the various functions in a forward path (shown by the solid connection lines) to produce an encoded or a compressed bitstream 88: an intra/inter prediction stage 72, a transform stage 74, a quantization stage 76, and an entropy encoding stage 78. Encoder 70 may also include a reconstruction path (shown by the dotted connection lines) to reconstruct a frame for encoding of further blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within video stream 50 is processed in units of blocks. At intra/inter prediction stage 72, each block can be encoded using either intra-frame prediction (i.e., within a single frame) or inter-frame prediction (i.e. from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (residual). Transform stage 74 transforms the residual into transform coefficients in, for example, the frequency domain. Examples of block-based transforms include the Karhunen-Loève Transform (KLT), the Discrete Cosine Transform ("DCT") and the Singular Value Decomposition Transform ("SVD"). In one example, the DCT transforms the block into the frequency domain. In the case of DCT, the transform coefficient values are based on spatial frequency, with the lowest frequency (i.e. DC) coefficient at the top-left of the matrix and the highest frequency coefficient at the bottom-right of the matrix.

Quantization stage 76 converts the transform coefficients into discrete quantum values, which are referred to as quantized transform coefficients or quantization levels. The quantized transform coefficients are then entropy encoded by entropy encoding stage 78. The entropy-encoded coefficients, together with other information used to decode the block, such as the type of prediction used, motion vectors and quantizer value, are then output to a compressed bitstream 88. Compressed bitstream 88 can be formatted using various techniques, such as run-length encoding (RLE) and zero-run coding.

The reconstruction path in FIG. 3 (shown by the dotted connection lines) can be used to help ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual signal directly without transform stage 74. In another embodiment, encoder 70 can have quantization stage 76 and dequantization stage 80 combined into a single stage.

Figure 4:
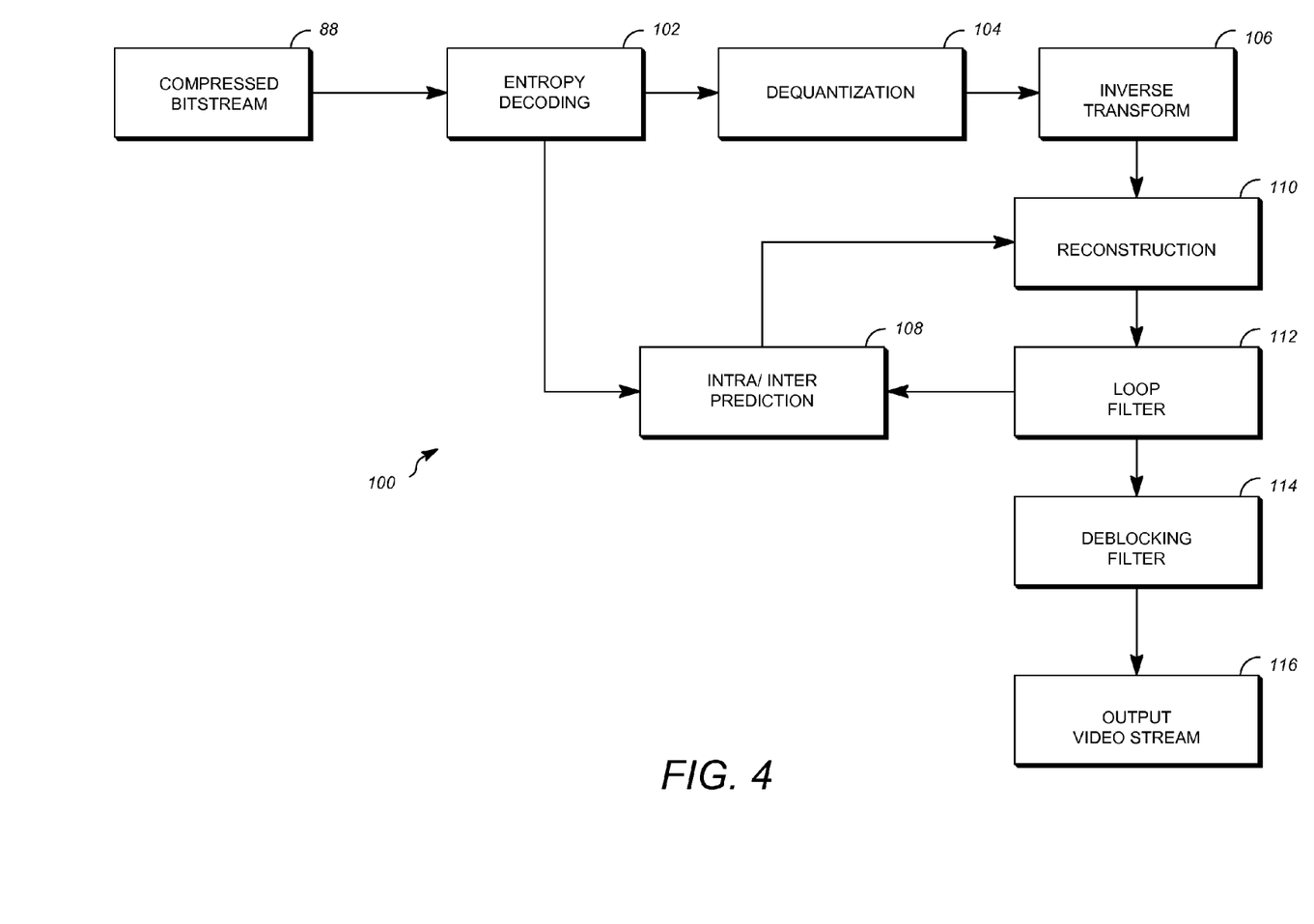
FIG. 4 is a block diagram of a video decompression system in accordance with another embodiment.

FIG. 4 is a block diagram of a decoder 100 in accordance with another embodiment of this disclosure. Decoder 100 can be implemented, as described above, in receiving station 30. Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112, and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 (using, for example, Context Adaptive Binary Arithmetic Decoding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by reconstruction stage 84 in encoder 70. Using header information decoded from compressed bitstream 88, decoder 100 can use intra/inter prediction stage 108 to create the same prediction block as was created in encoder 70. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116.

Other variations of decoder 100 can be used to decode compressed bitstream 88. For example, decoder 100 can produce output video stream 116 without deblocking filtering stage 114.

As mentioned above, intra/inter prediction stages 72 and 108 can implement an intra-frame prediction step that attempts to reduce the amount of data in the video stream. The reduction is based on spatial data redundancy within a given frame due to the high correlation between selected portions within that frame. Typically, intra-frame prediction uses available neighbors to predict data of the current block. Intra prediction for 16×16 and/or for 4×4 blocks may use, for example, DC-, vertical-, horizontal-, or diagonal-predictions. According to one typical frame size, about five 16×16 prediction modes and ten 4×4 prediction modes are available. To select which prediction mode gives the best compression efficiency, all available modes are tested to select the one that gives best compression efficiency. In this case, testing would involve 165 modes in total (five 16×16 modes plus ten 4×4 modes for each 4×4 block). Using more block sizes may reduce the size of the compressed image, but they significantly increase of the number of possible combinations of blocks to a number too high to test, particularly for real-time video encoding. Note that these exemplary numbers of prediction modes are based on luminance data only. Prediction of chrominance data in a frame adds to the number of modes to be tested.

In contrast, exemplary implementations of this disclosure speed up intra-frame prediction value calculations by detecting local edge orientations (also called edge directions herein), grouping blocks according to similar edge directions and, in one embodiment, calculating intra-frame prediction values on a reduced set of modes on maximally sized blocks. This reduces the time required for intra-frame prediction calculations by reducing the number of blocks to calculate and possibly reducing the number of modes to calculate on those blocks while maintaining perceived image quality. Knowing the predominant edge direction in a block (which includes knowing whether any edge direction is actually predominant) can speed up the calculation of intra-frame prediction values by leveraging the observation that when a block contains strong edge information in a single direction, it is very likely that the best intra-frame prediction values will be in a direction parallel to the edge direction.

Figure 5:
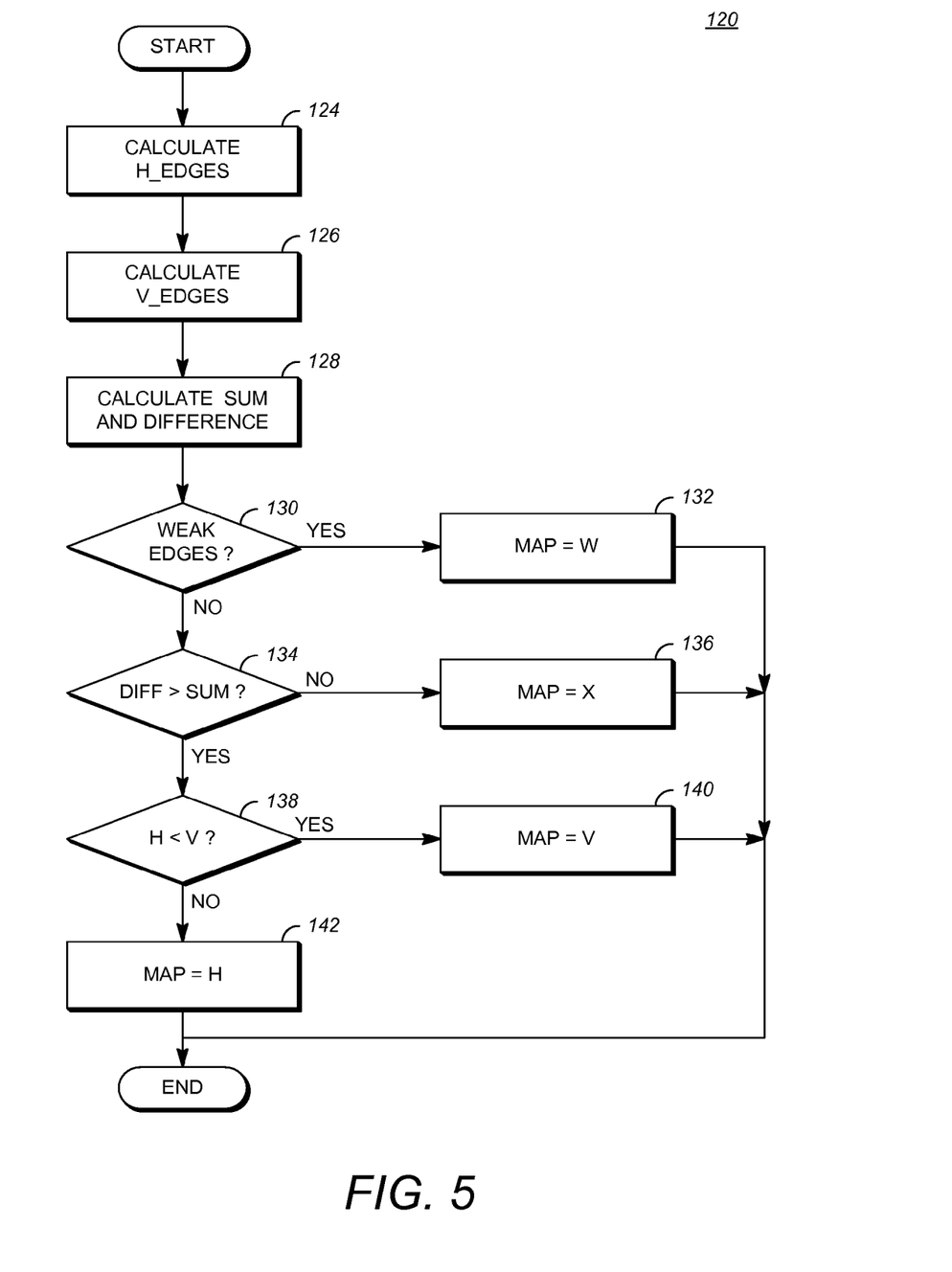
FIG. 5 is a flowchart of a process of edge classification of a block in accordance with one embodiment of this disclosure.

One example of this implementation can be described by first referring to FIG. 5. FIG. 5 is a flowchart of a process of edge classification 120 of a block in accordance with this disclosure. In this example, the block comprises 16×16 pixels, and processing is performed on sub-blocks comprising 4×4 pixels. Other block sizes and processing by different size sub-blocks are also possible.

Edge classification 120 begins by detecting horizontal and vertical edges, and their edge strengths, inside each 4×4 sub-block in steps 124 and 126, respectively. In one application, edge strengths are calculated in steps 124 and 126 using luminance data of the pixels forming each sub-block with a modified Prewitt operator as discussed in additional detail hereinafter. However, other first-order difference edge detection calculations could be used. It is also possible that other calculations could be used for edge detection, such as second-order difference methods; such other calculations would typically require more processing time. Moreover, although in one application intensity in the form of luminance data of the pixels is used to calculate edge strengths, other measures of pixel intensity could be used, including a full color value of the pixel.

Following the calculation of edge strengths in steps 124 and 126, those values are used to create (or resolve) an edge map. Essentially, thresholds are used to determine if the current sub-block has a dominant vertical edge, a horizontal edge or an edge in both directions. In addition, if there is no clear edge in any orientation, the 4×4 edge map is filled with a common value as discussed in additional detail hereinafter.

The first step in resolving the edge map is calculating squared sum S and differences D of the edge strength values for each 4×4 sub-block i in step 128 according to $$D=|[h(i)]^2-[v(i)]^2|; \text{ and} \qquad (1)$$

$$S=\{[h(i)]^2+[v(i)]^2\}/2; \text{ wherein} \qquad (2)$$

v(i) is the vertical edge strength for sub-block i; and h(i) is the horizontal edge strength for sub-block i.

These values are then compared to thresholds to decide if the current sub-block has a dominant vertical edge, a dominant horizontal edge or an edge in both directions. In addition, one value is selected if there is no clear edge in either direction. A variety of comparisons and thresholds can be used. For example, thresholds could be adjusted depending on content, etc. Those used in an exemplary implementation described herein to resolve the edge map are shown in step 130 through step 142.

More specifically, one step in resolving the edge map is to determine whether the edges are small (or weak), meaning that both the horizontal and vertical edge strengths are less than a preselected threshold. In one example, if the absolute values of h(i) and v(i) are both less than three, the edges are weak. If the edges are weak in step 130, the edge map value for the position representing the 4×4 block i is set to a value, e.g. "W", in step 132. Setting the edge map value to such a value "W" means that sub-block i contains predominately weak edges. When later combining sub-blocks, blocks mapped as W could be combined with other blocks mapped as W, or blocks marked as W could be combined either with blocks having strong vertical edges or with blocks having strong horizontal edges to create bigger blocks. In some cases it may be advantageous to group blocks with weak edges together without blocks having strong vertical or horizontal edges in order to create larger blocks with uniformly weak edges that are good candidates for DC-mode prediction since such blocks appear to be devoid of image detail (e.g. the image area is rather smooth). Alternatively, instead of mapping blocks as W and grouping them as described, blocks containing predominately weak edges could be mapped immediately as having strong vertical and/or horizontal edges before proceeding to the grouping process.

If the edges are determined to be not weak in step 130, processing advances to step 134 to begin to compare the edge strengths to each other. In step 134, if difference D is less than or equal to sum S, the horizontal and vertical edges are both strong. The edge map value for the position representing the 4×4 block i in the edge map is set to a value, e.g. "X", representing a "mixed" block in step 136. Accordingly, an "X" in the edge map means that both edges are present in the 4×4 block i. If instead difference D is greater than sum S in step 134, the horizontal and vertical edge strengths are compared in step 138 to set the edge map value for the position representing the 4×4 block i to either "V" or "H". More specifically, if the absolute value of the horizontal strength h(i) is less than the absolute value of the vertical strength v(i) in step 138, the edge map value for the position representing the 4×4 block i is set to "V" in step 140 to reflect that the block has a dominant vertical edge. Otherwise the edge map value for the position representing the 4×4 block i is set to "H" in step 142 to reflect that the block has a dominant horizontal edge.

Intra-frame prediction can also use directional derivatives calculated in directions other than horizontal or vertical, for example diagonally from upper left to lower right or upper right to lower left. These directional derivatives can be calculated from the original data or formed from the horizontal and vertical derivatives.

Once the edge map is resolved, that is, each position in the edge map is assigned a value based on the vertical and horizontal edge strengths for each 4×4 block i, processing in FIG. 5 ends.

Figure 6:
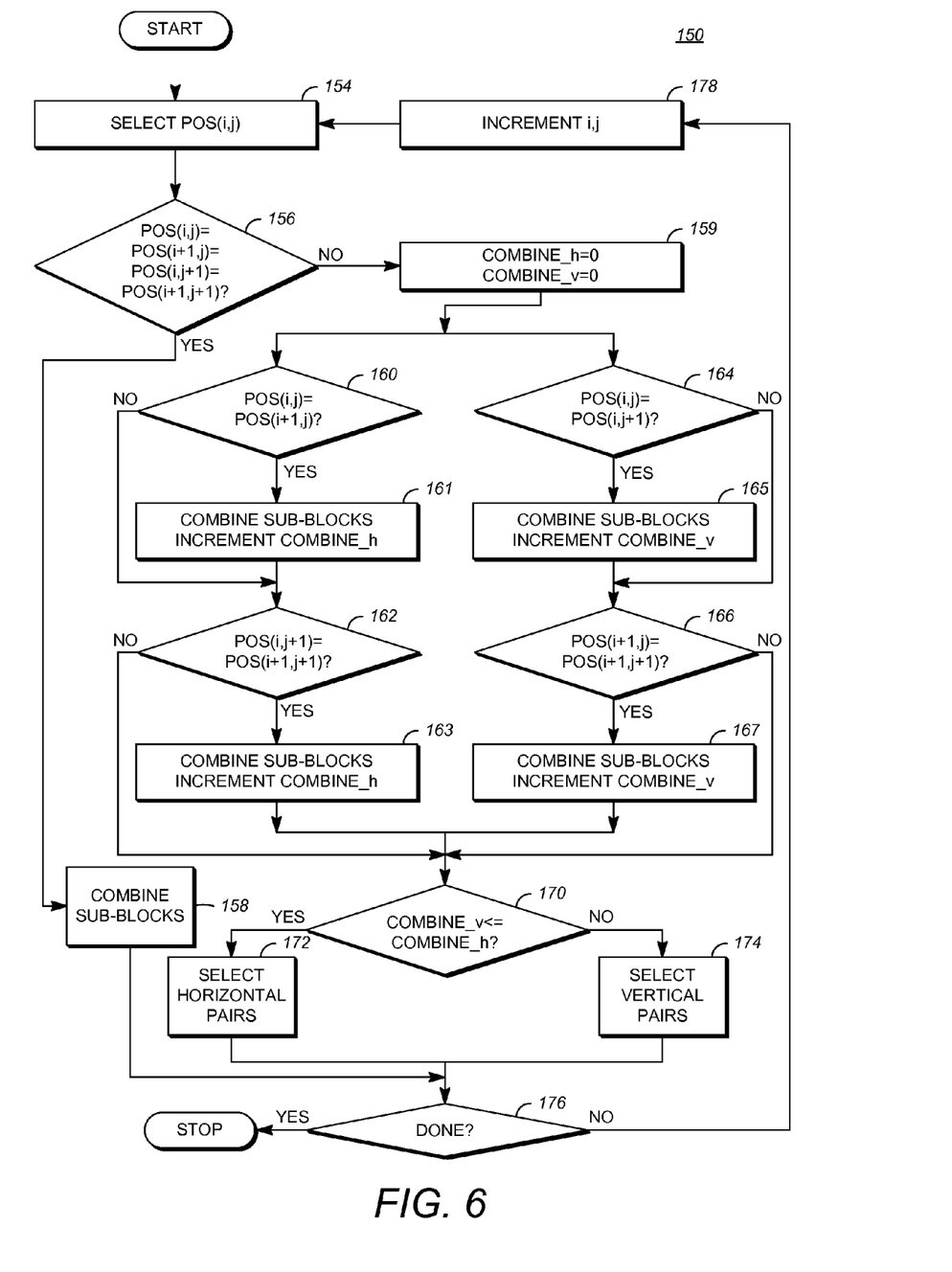
FIG. 6 is a flowchart of a process of resolving sub-block partitioning for an edge map generated by the edge classification process of FIG. 5.

Next, sub-block partitioning is resolved. That is, the best partitioning for the current macroblock is generated by grouping sub-blocks based on the edge map generated in FIG. 5. FIG. 6 is a flowchart of a process 150 of resolving sub-block partitioning for an edge map generated by the edge classification process of FIG. 5. Basically, the process 150 of FIG. 6 groups sub-blocks into larger groupings, if possible, so as to reduce subsequent processing.

The grouping process 150 of FIG. 6 steps through each of the edge map positions and values. Assuming that the edge map (which is a 4×4 map in this example) is analyzed in raster order like the original image frame from which the values were calculated, the process steps across the map from upper left to lower right in an attempt to build larger blocks from neighboring 4×4 sub-blocks with similar edge directions. In step 154, the edge map value at position i,j is selected. In addition, counters combine_h and combine_v are initialized to zero. In step 156, the value at position (i,j) is compared to the value immediately to the right (i.e., at position (i+1,j)), the value immediately beneath the selected position (i.e., at position (i,j+1)), and the value below and to the right (i.e., at position (i+1,j+1)).

If the edge map values match in step 156, there are at least four contiguous 4×4 blocks with the same edge direction. They are combined to form a partition of sub-blocks in step 158 before processing ends for the selected position. Note that when grouping/combining blocks to form a partition, the following edge map types could be used to combine adjacent blocks: V+V, H+H, W+W, W+V and/or W+H. In other words, the requirement that the values at all partitions match here and in later steps of the algorithm could be implemented by setting rules for whether blocks with weak edges should be combined with blocks having strong vertical edges or strong horizontal edges or having both edges when those blocks are mapped as X. When blocks having weak edges are mapped as one of V or H in the initial steps, grouping can instead use that value for matching. While mixed-edge blocks designated with an "X" can be combined with other blocks so designated or with weak blocks, in practice such combinations would be hard to utilize as mixed-edge blocks generally contain a lot of details. Blocks in such combinations might instead benefit from totally different prediction modes.

If the values do not match in step 156, the algorithm advances to step 159, where counters combine_h and combine_v are kept at/reset to zero. Then, processing occurs along parallel paths defined by steps 160-163 and steps 164-

167. At step 160 of the first path, a determination is made as to whether the value at the selected position (i,j) matches that to the right at position (i+1,j). If the value at the selected position (i,j) matches the value immediately to the right in step 160, the current block is combined with the adjacent block to the right and counter combine_h is incremented in step 161. Processing then advances to step 162. If the edge map values do not match in step 160, processing advances directly to step 162.

In step 162, the edge map values at the position immediately below selected position (i,j) and below and to the right of selected position (i,j) are compared. That is, step 162 asks if the value at position (i,j+1) is equal to or otherwise matches the value at position (i+1,j+1). If so, this block pair is combined and counter combine_h is incremented in step 163 before processing advances to step 170. Otherwise, the values do not match in step 162, and processing advances directly to step 170.

In the second processing path starting at step 164, the value at the selected position (i,j) is compared to that below at position (i,j+1). If the value at the selected position (i,j) matches the value immediately below in step 164, the current block is combined with this adjacent block and counter combine_v is incremented in step 165. Processing then advances to step 166. If the edge map values do not match in step 164, processing advances directly to step 166.

In step 166, the edge map values at the position immediately to the right of selected position (i,j) and below and to the right of selected position (i,j) are compared. That is, step 166 asks if the value at position (i+1,j) is equal to or otherwise matches the value at position (i+1,j+1). If so, this block pair is combined and counter combine_v is incremented in step 167 before processing advances to step 170. Otherwise, the values do not match in step 166, and processing advances directly to step 170.

After processing both paths, the counters combine_h and combine_v are compared to see if the blocks should be combined horizontally or vertically. If combine_v is less than or equal to combine_h, the horizontal pairs are selected in step 172. Otherwise the vertical pairs are selected in step 174. In next step 176, it is determined whether all of the desired blocks have been processed. If more blocks require processing, indices i,j are incremented to the next position as needed to access the next block for processing. Otherwise, processing ends. The processing for a selected position as described essentially forms minimum horizontally- or vertically-arranged partitions of two 4×4 blocks (resulting in a minimum partition size of 4×8 or 8×4).

In this example, 4×4 blocks are combined to form 4×8, 8×4 or 8×8 blocks in a first pass. A second pass through the blocks identifying previously combined blocks and incrementing the indices i, j by two instead of one can further combine the 8×8 blocks into 8×16, 16×8 or 16×16 blocks using the same algorithm. This can be accomplished by programming steps 160, 162, 164 and 166 to recognize when to combine previously combined blocks and when not to combine previously combined blocks. This would prevent the routine from attempting to form 4×16 or 16×4 blocks, if this were desired. Also, this routine can be programmed to preferentially group blocks vertically, instead of horizontally as shown in step 170, in situations where similarly-sized vertical groupings would be available. When preferentially grouping blocks vertically, vertical pairs are selected in step 174 (rather than horizontal pairs in step 172) when combine_v=combine_h at step 170. FIG. 6 is only one example showing how blocks with similar edge directions can be grouped to form larger blocks. Other routines to group similar blocks could be used without deviating from the intent of this disclosure.

Figure 7:
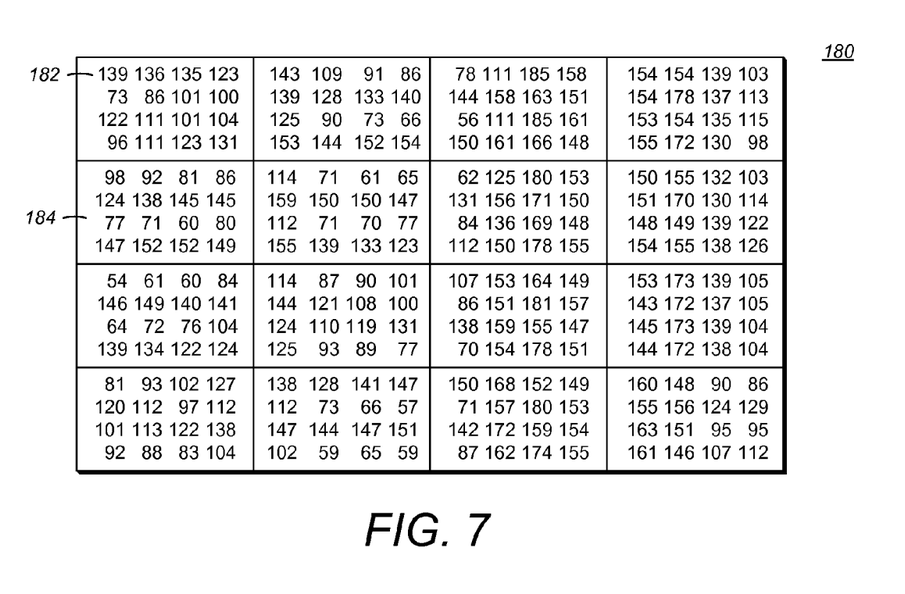
FIG. 7 is a diagram of exemplary image data for a block to be encoded.

FIGS. 7-10 illustrate exemplary inputs and outputs of the processes 120, 150. In a typical example, a frame is initially decomposed by encoder 70 into a luminance image and one or more chrominance images that contain information on the intensity and the color of the frame respectively. These images may be encoded separately or the chrominance images may use the same sub-block partition as the luminance image. In the example shown here, the luminance image is intra coded using the partitions determined in FIGS. 5 and 6. FIG. 7 is a diagram of exemplary image data 180 for a block to be encoded. More specifically, a 16×16 macroblock 180 of luminance (or intensity) values 182 are represented by eight-bit positive integers. Macroblock 180 is divided into 4×4 sub-blocks, or blocks, 184.

Figure 8A:
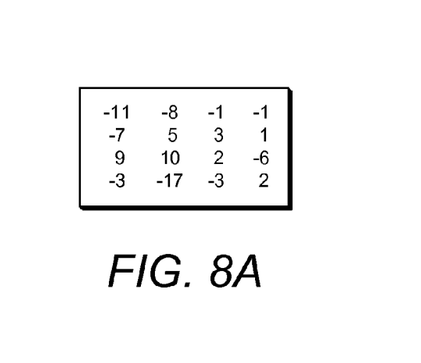
FIG. 8A is a diagram showing horizontal edge strengths generated during the edge classification process of FIG. 5 for the block of FIG. 7.
Figure 8B:
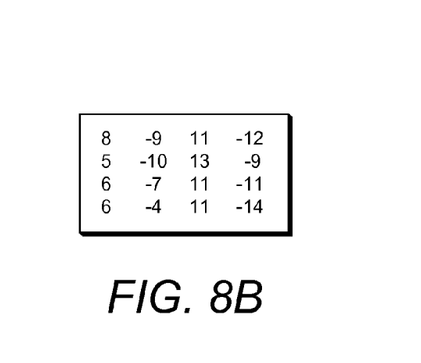
FIG. 8B is a diagram showing vertical edge strengths generated during the edge classification process of FIG. 5 for the block of FIG. 7.

FIG. 8A is a diagram showing horizontal edge strengths generated during the edge classification process of FIG. 5 for the block of FIG. 7, and FIG. 8B is a diagram showing vertical edge strengths generated during the edge classification process of FIG. 5 for the block of FIG. 7. These edge strengths h(i) and v(i) are generated in steps 124 and 126 of FIG. 5. As mentioned previously, in this example the edge strengths are calculated with a modified Prewitt operator. The calculations are performed for each grouping of 4×4 sub-blocks 184 as follows for k=0 to 3:

$$v(i) = \{[v0(k+1)-v0(k)] + [v1(k+1)-v1(k)] + [v2(k+1)-v2(k)] + [v3(k+1)-v3(k)]\}/16; \text{ and}$$

$$h(i) = \{[h0(k+1)-h0(k)] + [h1(k+1)-h1(k)] + [h2(k+1)-h2(k)] + [h3(k+1)-h3(k)]\}/16; \text{ wherein}$$

v0( ) is the luminance value in the first row of 4×4 sub-block i at a position k or k+1;
v1( ) is the luminance value in the second row of 4×4 sub-block i at a position k or k+1;
v2( ) is the luminance value in the third row of 4×4 sub-block i at a position k or k+1;
v3( ) is the luminance value in the fourth row of 4×4 sub-block i at a position k or k+1;
h0( ) is the luminance value in the first column of 4×4 sub-block i at a position k or k+1;
h1( ) is the luminance value in the second column of 4×4 sub-block i at a position k or k+1;
h2( ) is the luminance value in the third column of 4×4 sub-block i at a position k or k+1; and
h3( ) is the luminance value in the fourth column of 4×4 sub-block i at a position k or k+1.

Depending upon the image size, calculating all edge values for blocks may require overfill of the right and/or bottom edges by known techniques, e.g. replicating rightmost or bottommost pixels to get a suitable size for edge calculations.

Figure 9:
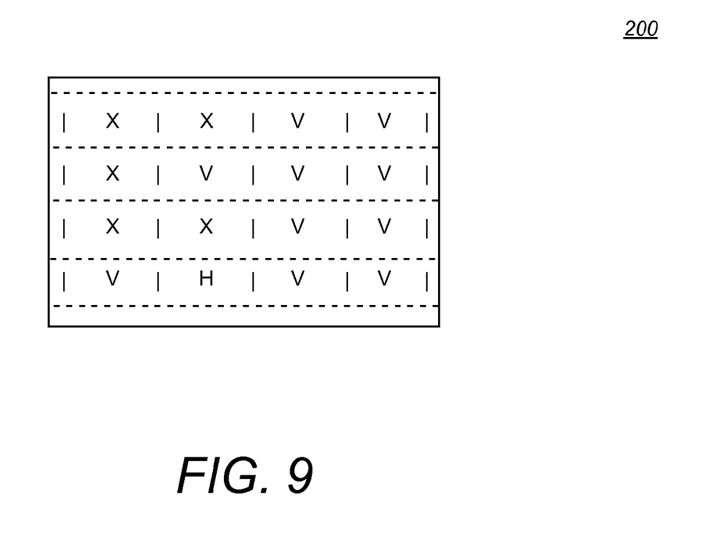
FIG. 9 is a diagram showing an edge map generated during the edge classification process of FIG. 5 using the edge strengths of FIGS. 8A and 8B.

FIG. 9 is a diagram showing an edge map 200 generated during the edge classification process of FIG. 5 using the edge strengths of FIGS. 8A and 8B. More specifically, the horizontal and vertical edge strengths shown in FIGS. 8A and 8B are used to generate sum S and difference D as described in step 128, and then those values, together with the edge strength values are compared as described in steps 130-142 to create/resolve edge map 200. This edge map 200 classifies the 4×4 sub-blocks as containing predominately horizontal (H) edges, predominately vertical (V) edges or mixed (X) edges because weak edges are either not present or in this example or are classified as predominantly vertical (V) edges. A decision to classify all weak edges as vertical edges could be made to enhance the ability of the algorithm to group 4×4 blocks together. In one implementation, this was observed to speed calculations with no obvious degradation to perceived image quality. Other decisions to classify weak edges as horizontal or mixed edges could be made depending on the image analyzed.

Figure 10:
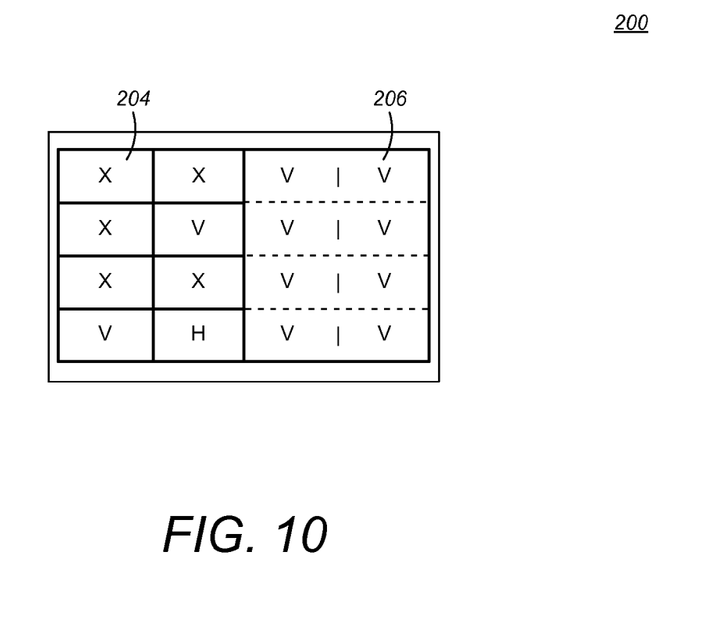
FIG. 10 is a diagram showing partitioning for the block of FIG. 7 generated during the sub-block partitioning process of FIG. 6 using the edge map of FIG. 9.

FIG. 10 is a diagram showing partitioning for the block of FIG. 7 generated during the sub-block partitioning process 150 of FIG. 6 using the edge map 200 of FIG. 9. In FIG. 10, some 4×4 sub-blocks i cannot be grouped further and remain as unpartitioned 4×4 blocks 204. However, the contiguous group of 4×4 sub-blocks with predominantly vertical V edges is grouped into an 8×16 block partition 206. In this example, processing can be sped up since some of the 4×4 sub-blocks have had their predominant edge direction identified (H, V or X). This means that fewer modes will have to be tried for these sub-blocks. In addition, the 4×4 sub-blocks forming 8×16 block partition 206 can be analyzed as a group. Not only can fewer modes be tried since a predominant edge direction has been identified, but fewer calculations will be performed since there are fewer individual blocks to process.

Provided with the partitioned edge map 200 of FIG. 10, which prediction mode gives the most efficient compression can be assessed. More specifically, intra-frame prediction relies on several modes to form the predicted block. Intra-frame prediction populates portions of a block with values from adjacent blocks and then propagates those values across the block according to the selected mode. Commonly used modes include, as mentioned by example above, DC-, horizontal-, vertical- or diagonal-prediction modes. There is more than one type of diagonal-prediction mode. For example, some codecs include a vertical-left prediction mode, a vertical-right prediction mode, a horizontal-up prediction mode and a horizontal-down prediction mode.

DC mode takes a single value from the preceding blocks and fills the predicted block with that single value. Horizontal mode takes values from preceding blocks arranged along the left edge of the block and propagates them across the predicted block so all of the rows are constant values. Likewise, vertical mode takes values from preceding blocks arranged along the top of the block and propagates them down the columns of the predicted block. Diagonal mode propagates values along the diagonal (combining vertical and horizontal values). Creation of the predicted block is followed by subtracting the predicted block from the block being processed to form the residual to be encoded. The most efficient mode can be considered to be the mode that results in the smallest residual and hence results in the smallest number of bits to transmit in the compressed bitstream. As described above, embodiments taught herein can reduce the number of blocks analyzed and potentially reduce the number of modes to be tried by selecting the mode based on edge direction and strength rather than trial and error, thereby increasing the efficiency of the encoding process. For example, 8×16 block 206 could be analyzed using a vertical mode, a vertical-left prediction mode or a vertical-right prediction mode, but analysis using any horizontal modes could be omitted if desired. As mentioned above, combined weak W blocks could benefit from using the DC prediction mode since the pixel values do not substantially differ from each other. A block or block partition with a dominant horizontal edge indicates that it may be desirable to test at least the horizontal, horizontal-up and horizontal-down prediction modes.

The above examples describe either combining weak W blocks together or combining them, where possible, with adjacent blocks having strong dominant vertical V or horizontal H edges. In some cases, however, the weak W blocks may not combined into a block partition even when they are adjacent by modifying the code to reflect that the best prediction mode for weak W blocks may vary. One example of this would be coding a square-shaped partition having four weak W blocks using the DC prediction mode while combining individual weak W blocks with dominant vertical or horizontal blocks.

The encoded residuals for the blocks generated using the selected prediction modes are transmitted with the prediction modes as part of a compressed bitstream to be decoded. When presented for decoding, the data elements within the bitstream can be decoded to produce a set of quantized transform coefficients. The quantized transform coefficients are dequantized then inverse transformed to produce a derivative residual that can be identical to that created by reconstruction stage 84 in encoder 70. Header information decoded from the bitstream allows the decoder to create or select the same prediction block as was used in encoder 70 to generate the residual. The prediction block is then added to the residual to create a reconstructed block. These steps are performed for each block of a frame to be decoded. Filters can be applied to reduce blocking artifacts and/or blocking distortion to render a decoded frame.

The embodiments of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" throughout is not intended to mean the same embodiment unless described as such.

The embodiments of transmitting station 12 and/or receiving station 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device (i.e. a cell phone). In this instance, transmitting station 12 can encode content using encoder 70 into an encoded video signal and transmit the encoded video signal to the communications device. In turn, the communications device can then decode the encoded video signal using decoder 100. Alternatively, the communications device can decode content stored locally on the communications device, i.e. content that was not transmitted by transmitting station 12. Other suitable transmitting station 12 and receiving station 30 implementation schemes are available. For example, receiving station 30 can be a generally stationary personal computer rather than a portable communications device and/or a device including encoder 70 may also include decoder 100.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a frame of a video stream comprising a plurality of frames, the method comprising:
    selecting a plurality of blocks of the frame, wherein each of the plurality of blocks comprises a same number of pixels having respective values as image data;
    detecting, for each selected block of the plurality of blocks, an edge orientation of the image data within the selected block, wherein the edge orientation is one of a horizontal edge orientation, a vertical edge orientation, a mixed edge orientation or a weak edge orientation;
    grouping a first block with at least one adjacent block of the plurality of blocks to form a block partition when the first block and the at least one adjacent block have a matching edge orientation;
    grouping a second block having a weak edge orientation with the block partition, the block partition formed of blocks having the horizontal edge orientation or the vertical edge orientation;
    testing a plurality of intra prediction modes for encoding the block partition using a processor;
    selecting a prediction mode for encoding the block partition from the plurality of intra prediction modes based upon a result of testing the plurality of intra prediction modes; and
    encoding the block partition based on the selected prediction mode.

2. The method of claim 1, further comprising:
    selecting the plurality of intra prediction modes for the testing based on the edge orientation of the first block.

3. The method of claim 1 wherein each of the plurality of blocks comprises a plurality of pixels having respective intensity values, and wherein detecting the edge orientation comprises:
    calculating a horizontal strength of a horizontal edge within a respective block using the intensity values;
    calculating a vertical strength of a vertical edge within the respective block using the intensity values; and
    defining the edge orientation for the respective block based on a comparison of the horizontal strength and the vertical strength.

4. The method of claim 3 wherein defining the edge orientation for the respective block comprises:
    selecting one of the horizontal edge orientation, the vertical edge orientation or the weak edge orientation for the edge orientation when the horizontal strength is below a horizontal threshold value and the vertical strength is below a vertical threshold value;
    selecting the mixed edge orientation for the edge orientation when the horizontal strength is at or above the horizontal threshold value, the vertical strength is at or above the vertical threshold value, and a measurement of a difference between the horizontal strength and the vertical strength is at or below a difference threshold value;
    selecting the horizontal edge orientation for the edge orientation when the horizontal strength is at or above the horizontal threshold value, the measurement of the difference between the horizontal strength and the vertical strength is above the difference threshold value and the horizontal strength is greater than the vertical strength; and
    selecting the vertical edge orientation for the edge orientation when the vertical strength is at or above the vertical threshold value, the measurement of the difference between the horizontal strength and the vertical strength is above the difference threshold value and the vertical strength is greater than the horizontal strength.

5. The method of claim 4 wherein the vertical threshold value is equal to the horizontal threshold value, and the difference threshold value is equal to:

$$\{[h(i)]^2 + [v(i)]^2\}/2, \text{ wherein}$$

v(i) is the vertical strength for block i and
h(i) is the horizontal strength for block i.

6. The method of claim 1 wherein testing the plurality of intra prediction modes comprises testing a subset of a total set of available intra prediction modes, wherein the subset is determined by the edge orientation for the block partition.

7. The method of claim 6 wherein the total set of available intra prediction modes includes a DC-prediction mode, a horizontal-prediction mode, a vertical-prediction mode and at least one diagonal-prediction mode.

8. The method of claim 6 wherein testing the subset of the total set of available intra prediction modes comprises:
    generating a predicted block for the block partition using a respective intra prediction mode of the subset; and
    calculating an efficiency of compression of the block partition for the respective intra prediction mode using the predicted block associated with the respective intra prediction mode; and wherein selecting the prediction mode comprises selecting one mode of the subset having a highest efficiency of compression.

9. The method of claim 8 wherein the one mode of the subset having the highest efficiency of compression has a smallest difference between pixel values of the predicted block and pixel values of the block partition.

10. The method of claim 1 wherein each of the plurality of blocks includes 4×4 pixels and the block partition comprises a minimum size of 16×16 pixels, the method further comprising:

maintaining a third block as unpartitioned when fewer than two adjacent blocks of the plurality of blocks do not have a matching edge orientation;

testing at least two intra prediction modes for encoding the third block based on the edge orientation of the third block;

selecting a prediction mode for the third block from the at least two intra prediction modes based upon a result of testing the at least two intra prediction modes; and encoding the third block based on the selected prediction mode.

11. An apparatus for encoding a frame in a video stream comprising a plurality of frames, the apparatus comprising:

a memory; and a processor configured to execute instructions stored in the memory to:

select a plurality of blocks of the frame;

detect, for each selected block of the plurality of blocks, an edge orientation within the selected block by:

calculating a horizontal strength of a horizontal edge within a respective block using the intensity values;

calculating a vertical strength of a vertical edge within the respective block using the intensity values;

selecting one of a horizontal edge orientation, a vertical edge orientation, or a weak edge orientation for the edge orientation when the horizontal strength and the vertical strength are both below a threshold value;

selecting a mixed edge orientation for the edge orientation when the horizontal strength and the vertical strength are at or above the threshold value and a measurement of a difference between the horizontal strength and the vertical strength is at or below a difference threshold value;

selecting the horizontal edge orientation for the edge orientation when the horizontal strength is at or above the threshold value, the measurement of the difference between the horizontal strength and the vertical strength is above the difference threshold value and the horizontal strength is greater than the vertical strength; and selecting the vertical edge orientation for the edge orientation when the vertical strength is at or above the threshold value, the measurement of the difference between the horizontal strength and the vertical strength is above the difference threshold value and the vertical strength is greater than the horizontal strength;

group a first block with at least one adjacent block of the plurality of blocks to form a block partition when the first block and the at least one adjacent block have a matching edge orientation;

test a plurality of intra prediction modes for encoding the block partition;

select a prediction mode for encoding the block partition from the plurality of intra prediction modes based upon a result of testing the plurality of intra prediction modes; and encode the block partition based on the selected prediction mode.

12. The apparatus of claim 11 wherein the processor is configured to:

select the plurality of intra prediction modes for the testing based on the edge orientation of the block partition.

13. The apparatus of claim 11 wherein the edge orientation of each selected block comprises one of a horizontal edge orientation, a vertical edge orientation, a weak edge orientation or a combined horizontal and vertical edge orientation.

14. The apparatus of claim 11 wherein the processor is configured to:

maintain any of the plurality of blocks of the frame without at least two adjacent blocks of the frame having a matching edge orientation as a unpartitioned block;

select at least two intra prediction modes for encoding the unpartitioned block;

test the at least two intra prediction modes; and encode the unpartitioned block using whichever of the at least two intra prediction modes results in a most efficient compression.

15. The apparatus of claim 11 wherein the difference threshold value is equal to:

$\{[h(i)]^2 + [v(i)]^2\}/2$, wherein v(i) is the vertical strength for block i and
h(i) is the horizontal strength for block i.

16. The apparatus of claim 11 wherein the plurality of intra prediction modes includes less than all available intra prediction modes, all available intra prediction modes including a DC-prediction mode, a horizontal-prediction mode, a vertical-prediction mode and at least one diagonal-prediction mode.

* * * * *